UNITED STATES PATENT OFFICE.

JOSEPH L. TURNER, OF PHILADELPHIA, PENNSYLVANIA, AND CHARLES E. VANDERKLEED, OF COLLINGSWOOD, NEW JERSEY, ASSIGNORS TO H. K. MULFORD COMPANY, OF PHILADELPHIA, PENNSYLVANIA, A CORPORATION OF PENNSYLVANIA.

PROCESS OF PREPARING ORGANIC IRON COMPOUNDS.

No. 906,474.  Specification of Letters Patent.  Patented Dec. 8, 1908.

Application filed July 15, 1907. Serial No. 383,869.

*To all whom it may concern:*

Be it known that we, JOSEPH L. TURNER, a subject of the Czar of Russia, and CHARLES E. VANDERKLEED, a citizen of the United States, residing, respectively, in Philadelphia, Pennsylvania, and Collingswood, New Jersey, have invented certain Improvements in Processes of Preparing Organic Iron Compounds, of which the following is a specification.

One object of our invention is to provide a process for the production of an organic iron compound of such a nature that it shall not only be suitable for ready absorption in the intestinal tract, but shall also be practically unaffected by the gastric juice. As a result when administered it will pass through the stomach in substantially an unaltered state into the intestinal canal, where, as above noted, it is available for absorption.

In preparing our compound, we first dissolve in a weak alkali the product resulting from the action of iron salts, such as soluble iron tartrate or citrate, upon a solution of a nucleo-proteid or an albumen, and then free the solution from any excess of alkali by dialyzing through a suitable membrane. The solution is finally treated with pancreatic juice.

As a typical example of the proportions employed in carrying out our invention, we dissolve 100 lbs. of the product obtained by the action of 110-pounds of iron and potassium tartrate on 110-pounds of casein in a solution of 10 lbs. of sodium hydroxid dissolved in 100 gals. of water. The solution is at once dialyzed against pure water to free it from the uncombined alkali, and upon the completion of the dialyzation, the solution is brought to a temperature of 98–99° F. 5 lbs. of pancreatic ferment (Pancreatin U. S. P.) or 350 grains for each gallon of solution are added in order to digest the compound in such a manner as to permit of its ready absorption in the intestines and the whole kept at the above noted temperature for about an hour. The resulting compound is then brought to the boiling point, cooled, and finally filtered.

The filtrate can be either dried *in vacuo* and the resulting compound scaled or powdered, or it may be used in the form of a solution with the aid of the necessary preservatives such as alcohol or the like.

It is to be understood that egg albumen is the equivalent of and may be substituted for the casein in carrying out our invention and that the proportions noted may be considerably varied without departing from said invention.

We claim as our invention:—

1. The process of preparing organic iron compounds which consists in dissolving an iron nucleo-proteid in a solution of an alkali, subjecting the resulting solution to dialysis against water, and reacting upon the resulting liquid with pancreatic ferment.

2. The process of preparing organic iron compound which consists in dissolving 100 lbs. of an iron nucleo-proteid compound in 100 gals. of water containing 10 lbs. of sodium hydroxid in solution, dialyzing the resulting compound against pure water and heating the dialyzed solution with 5 lbs. of pancreatic ferment at a temperature of 98–99° F., substantially as described.

3. The process of preparing organic iron compound which consists in dissolving in sodium hydroxid a product resulting from the action of soluble iron tartrate on a nucleo-proteid, dialyzing the solution against pure water, and then reacting upon the solution with pancreatic ferment.

In testimony whereof we have signed our names to this specification, in the presence of two subscribing witnesses.

JOSEPH L. TURNER.
CHARLES E. VANDERKLEED.

Witnesses:
WILLIAM E. BRADLEY,
JOS. H. KLEIN.